Nov. 30, 1965    J. F. WOHLER    3,220,309
LENS MOUNT UTILIZING CEMENTED SECTIONS
Filed Nov. 5, 1962    2 Sheets-Sheet 1

INVENTOR.
Johann F. Wohler
BY Arthur M. Sloan

Nov. 30, 1965  J. F. WOHLER  3,220,309
LENS MOUNT UTILIZING CEMENTED SECTIONS
Filed Nov. 5, 1962  2 Sheets-Sheet 2

INVENTOR.
Johann F. Wohler
BY Arthur M. Sloan

United States Patent Office 3,220,309
Patented Nov. 30, 1965

3,220,309
LENS MOUNT UTILIZING CEMENTED SECTIONS
Johann F. Wohler, Elgin, Ill., assignor to Varo, Inc.
Filed Nov. 5, 1962, Ser. No. 235,348
1 Claim. (Cl. 88—57)

This invention relates to a lens mount and method of holding lenses.

Heretofore methods of mounting lenses have consisted of placement of the lenses in tubular housings in accordance with the optical design requirements of the particular systems and utilization of edge spacers to maintain the proper separation. The cost of mounting lenses in this fashion is rather high and in the highly competitive business of commercial optics, the extra price for the tubular cell may disqualify the product.

Accordingly it is an object of this invention to provide a lens mount and method of holding lenses which is more economical than presently utilized methods.

Another object of this invention is to provide a new method of holding several lenses in axial alignment, whereby the group of lenses are permanently positioned in a fixed relation.

Still another object of this invention is to provide a new lens mount that fixes a group of lenses so that they can be treated like an ordinary single objective.

A further object of this invention is to provide a lens mount and method of holding lenses that is less complicated than presently utilized means.

Yet a further object of this invention is to provide a lens mount and method of holding lenses which does away with the necessity of a tubular cell in addition to the spacers.

Still a further object of this invention is to provide a lens mount and method of holding lenses which utilizes front and rear spacers to maintain the proper separation of two lenses while holding said two lenses in the proper axial alignment in reference to a third centrally located lens.

Another object of the invention is to provide a lens mount and method of mounting lenses wherein no threaded parts are necessary.

Still another object of this invention is to provide a self contained lens system wherein no adjustments are needed for proper functioning.

Yet another object of this invention is to provide a lens mount and method of holding lenses wherein the number of spacers necessary is determined according to the formula $S=L-1$.

Other objects of the invention will be apparent from the following description forming a part of this specification.

In order to make the invention more clearly understood, there is shown in the accompanying drawings, means for carrying the same into practical effect without limiting the improvements in their useful applications to the particular constructions, which for purposes of explanation have been made the subject of illustration.

Referring to the drawings.

Figure 1:
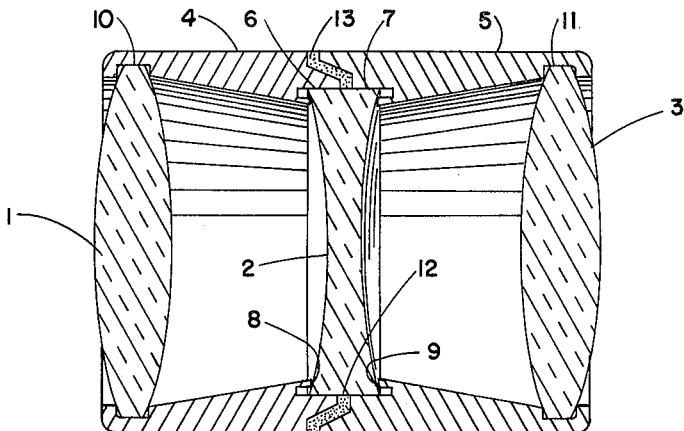
FIGURE 1 is a longitudinal cross section of a lens system utilizing the lens mount of this invention.
Figure 2:
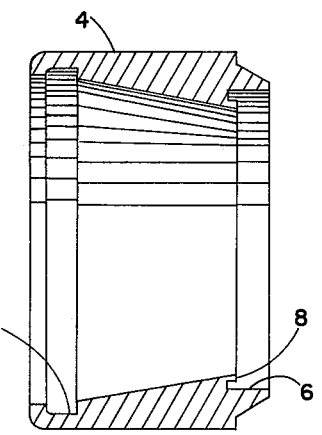
FIGURE 2 is a longitudinal cross section of a front spacer according to this invention.
Figure 3:
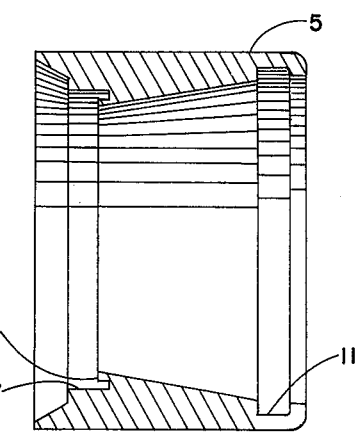
FIGURE 3 is a longitudinal cross section of a rear spacer according to this invention.
Figure 5:
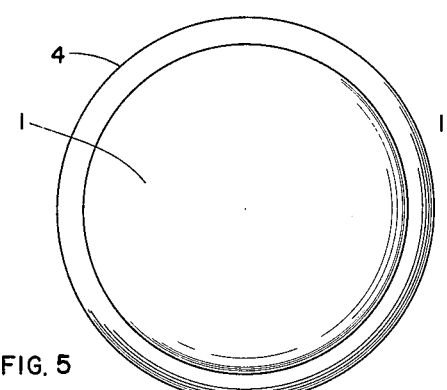
FIGURE 5 is an end view of a lens system utilizing the lens mount of this invention.
Figure 4:
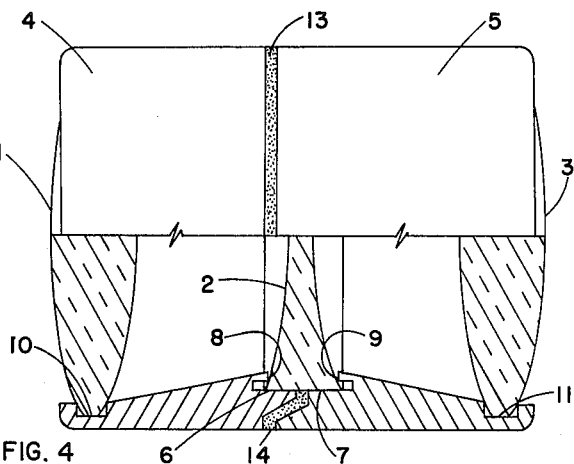
FIGURE 4 is a longitudinal view partially in section of a lens system utilizing the lens mount of this invention.
Figure 6:
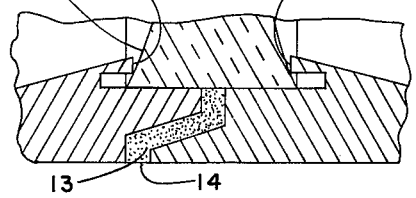
FIGURE 6 is a blown up sectional view showing the adhesive in the groove between the spacers.

In the drawing wherein a lens system including three lens elements is shown, the front crown or lens 1, the flint or centrally located lens 2, and the rear crown or lens 3 are maintained in proper separation and optical axial alignment with reference to each other by front spacer 4 and rear spacer 5.

The accuracy of the optical alignment of the flint 2 is given by the surface 6 of the front spacer 4, the surface 7 of the rear spacer 5, the flange 8 of the front spacer 4, the flange 9 of the rear spacer 5.

Optical alignment of front crown 1 and rear crown 3 is maintained respectively by annular seats 10 and 11.

The proper separation of the lenses is maintained by annular seats 10, 11, and 12. Annular seat 12 is formed by flanges 8 and 9 and surfaces 6 and 7.

When the lens system is assembled, a suitable adhesive 13 is applied in the groove 14 between the spacers to join the spacers together.

In assembly front lens 1 is inserted in annular seat 10, rear lens 3 is inserted in annular seat 11, and centrally located lens 2 is positioned between front spacer 4 and rear spacer 5 in annular seat 12. Suitable adhesive 13 is then applied in the groove 14.

Figure 7:
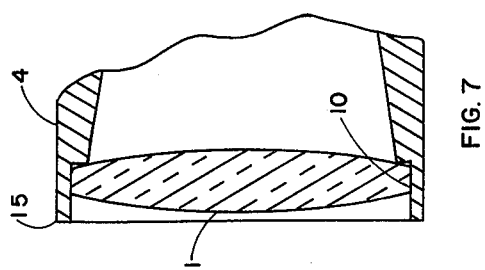
FIGURE 7 is a longitudinal cross section of a front spacer with a lens inserted showing a straight lip prior to folding over to form a lens seat.

As shown in FIGURE 7 the spacers may be constructed with straight lips 15 so that the front and rear lenses 1 and 3 may be readily inserted into the respective spacers and after insertion of the lenses the lips may be crimped, pressed, or folded over the polished faces of the lenses and cemented, welded, or soldered if necessary to form lens seats and properly secure the lenses in optical alignment to each other.

Provision for insertion of the front and rear lenses in the respective spacers may also be made by providing the spacers with longitudinal splits so that the spacers may be expanded and the lenses inserted. However this method might affect the optical alignment.

All of the lenses in the assembled lens system have a common optical axis. This is accomplished by grinding the lenses to a circular shape so that the optical axis of each lens goes through its center. The grinding can be done with great accuracy according to presently known methods. The lenses are then mounted, in accordance with this invention, in concentric relation to each other.

The separation of the lenses is controlled by two simple manufacturing tolerances, namely, the distance between flange 8 and seat 10 and the distance between flange 9 and seat 11.

This invention may be utilized with any number of lenses more than one according to the following formula:

$$S=L-1$$

where L is the number of air spaced lens components, a lens component being comprised of a single or simple lens element or a number of lens elements cemented or otherwise affixed to each other (a special case not covered by the above formula is where there are two or more air spaced lens components whose refracting surfaces touch each other), and S is the number of spacers required.

Figure 8:
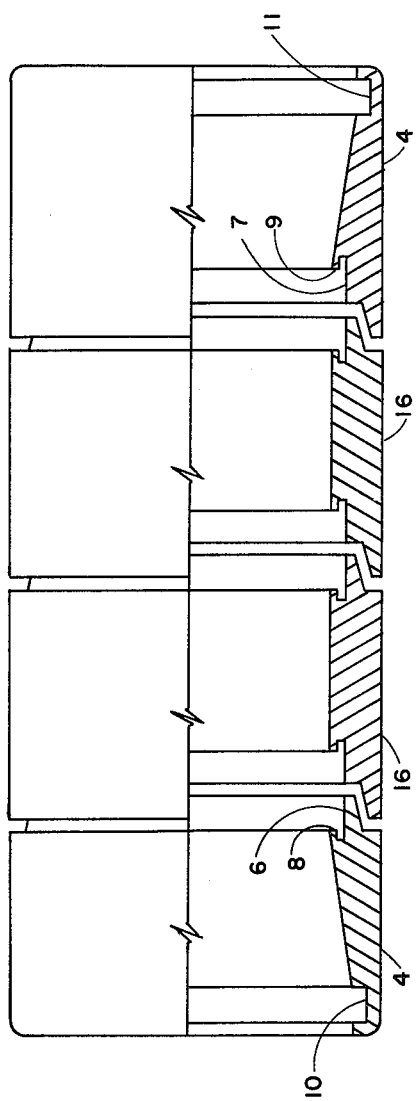
FIGURE 8 is a longitudinal view partially in section of a lens system utilizing more than two lens spacers according to this invention.

It follows that $L+S$, the maximum number of components, $=2L-1$.

Where there are more than three lens components, the intermediate lens spacers 16 would be utilized as shown in FIGURE 8.

Figure 9:
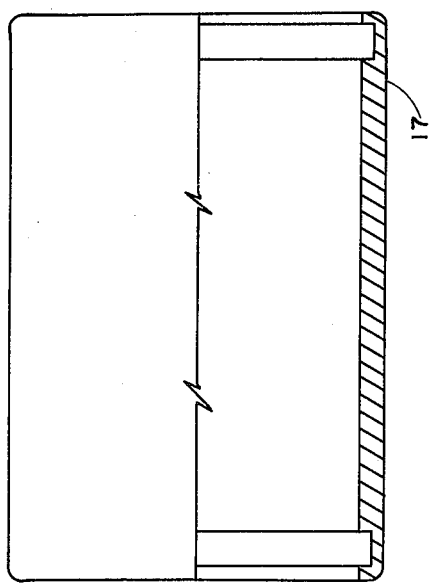
FIGURE 9 is a longitudinal view partially in section of a lens system utilizing one lens spacer according to this invention.

In the case of two lens components, the one required spacer, 17, would have annular seats at each of its two ends as shown in FIGURE 9.

Once a lens system is assembled according to this invention no adjustments are necessary.

It is not necessary that the lens spacers be cylindrical as illustrated. Either the front or rear spacer or both may take any desired external shape.

Thus, according to the lens mount and method of holding lenses of this invention, a group of lenses may be permanently positioned in a fixed relation so that the group of lenses can be treated like an ordinary single objective.

While certain embodiments of the invention have been disclosed, it is to be understood that the inventive idea may be carried out in a number of ways. This application is, therefore, not to be limited to the precise details described, but is intended to cover all variations and modifications thereof falling within the scope of the appended claim.

What I claim as my invention is:

A lens mount including a front spacer tapered internally, having an annular seat at its narrow end on the tapered side for receiving a lens, and an inset shoulder projecting from its other end, said shoulder having a taper on its inset exterior surface and a flange adjacent to its interior surface and a rear spacer, tapered internally, having an annular seat at its narrow end on the tapered side for receiving a lens, and a shoulder projecting from its other end, said shoulder having a taper on its inset interior surface, and a flange projecting from the rear spacer at its wide end on the tapered side, the flange adjacent to the interior surface of the front spacer shoulder, the interior surface of the front spacer shoulder, and the interior surface of the rear spacer at its wide end acting with the flange projecting from the rear spacer at its wide end to form an annular lens seat wherein a groove is formed exteriorly between the wide ends of the front and rear spacer and such groove is filled with cement.

References Cited by the Examiner

UNITED STATES PATENTS

| | | | |
|---|---|---|---|
| 1,154,232 | 9/1915 | Byron | 88—57 |
| 2,380,216 | 7/1945 | Carter | 88—57 |
| 2,529,894 | 11/1950 | Altman et al. | 88—57 |
| 3,048,079 | 8/1962 | Dine et al. | 88—1 |

DAVID H. RUBIN, *Primary Examiner.*

JOHN K. CORBIN, JEWELL H. PEDERSEN,
*Examiners.*

RONALD STERN, *Assistant Examiner.*